(12) United States Patent
Seeger (10) Patent No.: US 11,743,598 B2
(45) Date of Patent: Aug. 29, 2023

(54) LIGHT VALVE SYSTEMS AND METHODS

(71) Applicant: NBCUniversal Media, LLC, New York, NY (US)

(72) Inventor: Arley Christopher Seeger, Rockville Centre, NY (US)

(73) Assignee: NBCUNIVERSAL MEDIA, LLC, New York, NY (US)

(*) Notice: Subject to any disclaimer, the term of this patent is extended or adjusted under 35 U.S.C. 154(b) by 0 days.

(21) Appl. No.: 16/929,024

(22) Filed: Jul. 14, 2020

(65) Prior Publication Data

US 2022/0021797 A1  Jan. 20, 2022

(51) Int. Cl.
*G09G 3/36* (2006.01)
*H04N 23/75* (2023.01)
*H04N 23/71* (2023.01)

(52) U.S. Cl.
CPC .......... *H04N 23/75* (2023.01); *G09G 3/3625* (2013.01); *H04N 23/71* (2023.01); *G09G 2320/0626* (2013.01); *G09G 2360/144* (2013.01)

(58) Field of Classification Search
CPC ...... H04N 5/238; H04N 5/2351; H04N 19/46; H04N 9/07; H04N 5/232935; H04N 21/4318; H04N 23/62; G09G 3/3625; G09G 2320/0626; G09G 2360/144; G09G 3/2007; G09G 3/3233; G09G 3/3611; G02F 1/133528; G06V 10/60; G06T 5/009

See application file for complete search history.

(56) References Cited

U.S. PATENT DOCUMENTS

| | | | |
|---|---|---|---|
| 6,529,253 B1* | 3/2003 | Matsute | G02F 1/133528 349/96 |
| 11,102,421 B1* | 8/2021 | Seely | H04N 23/62 |
| 2003/0052989 A1* | 3/2003 | Bean | H04N 5/238 348/362 |
| 2003/0107682 A1* | 6/2003 | Sono | H04N 21/4318 348/576 |
| 2007/0242141 A1* | 10/2007 | Ciurea | H04N 5/238 348/239 |
| 2008/0007645 A1* | 1/2008 | McCutchen | H04N 5/238 348/360 |
| 2008/0129677 A1* | 6/2008 | Li | G09G 3/3611 345/102 |
| 2009/0232411 A1* | 9/2009 | Chen | G09G 3/2007 382/274 |
| 2015/0256740 A1* | 9/2015 | Kalama | H04N 5/232935 348/222.1 |
| 2016/0127629 A1* | 5/2016 | Sun | H04N 5/238 348/362 |
| 2016/0307602 A1* | 10/2016 | Mertens | H04N 19/46 |
| 2017/0230551 A1* | 8/2017 | Akkaya | H04N 9/07 |
| 2018/0089516 A1* | 3/2018 | Govindasamy | G06V 10/60 |
| 2020/0302659 A1* | 9/2020 | Urabe | G06T 5/009 |
| 2021/0383758 A1* | 12/2021 | Yin | G09G 3/3233 |

* cited by examiner

*Primary Examiner* — Richard J Hong
(74) *Attorney, Agent, or Firm* — Fletcher Yoder P.C.

(57) ABSTRACT

A clipping mitigation circuitry includes a light valve configured to reduce an amount of light captured by a camera and a controller configured to receive sensor feedback indicative of a light levels of an image captured by the camera, identify potential clipping in the image based on the light levels, and adjust the light valve based on the potential clipping to reduce the amount of light captured by the camera.

18 Claims, 4 Drawing Sheets

LIGHT VALVE SYSTEMS AND METHODS

BACKGROUND

The disclosure relates generally to light valve systems and methods.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A camera, such as a camera used for still photography and video photography, typically captures a scene that includes varying levels of light. For example, an outdoor scene may include sunlight reflected by objects within the scene and bright portions of a sky. An indoor scene may include light reflected by objects within the scene, such as furniture and people, and light emitted by light sources, such as lighting fixtures within the scene and lighting elements external to the scene that illuminate the scene. The camera may capture an image of the scene including the varying levels of light. In some instances, portions of the captured image may be clipped, such that those portions appear as white or yellow objects within the image. For example, in a portion of a captured image with sunlight reflected off a surface of a building, the building may not be clearly visible and may appear as a white or yellow object in the image, such that a viewer is not able to identify the building.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a clipping mitigation circuitry includes a light valve configured to reduce an amount of light captured by a camera and a controller configured to receive sensor feedback indicative of a light levels of an image captured by the camera, identify potential clipping in the image based on the light levels, and adjust the light valve based on the potential clipping to reduce the amount of light captured by the camera.

In an embodiment, a method for controlling a light valve configured to reduce an amount of light captured by a camera includes receiving an indication of light levels of an image captured by the camera, identifying one or more locations of potential clipping within the image based on the light levels, and adjusting the light valve to reduce the amount of light captured by the camera at the one or more locations.

In an embodiment, a camera assembly includes a sensor assembly configured to detect light entering the camera assembly and light-blocking circuitry configured to block light directed toward the sensor assembly. The light-blocking circuitry is configured to receive a command indicative of an adjustment to block light entering the camera assembly to prevent potential clipping in an image captured by the camera assembly.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
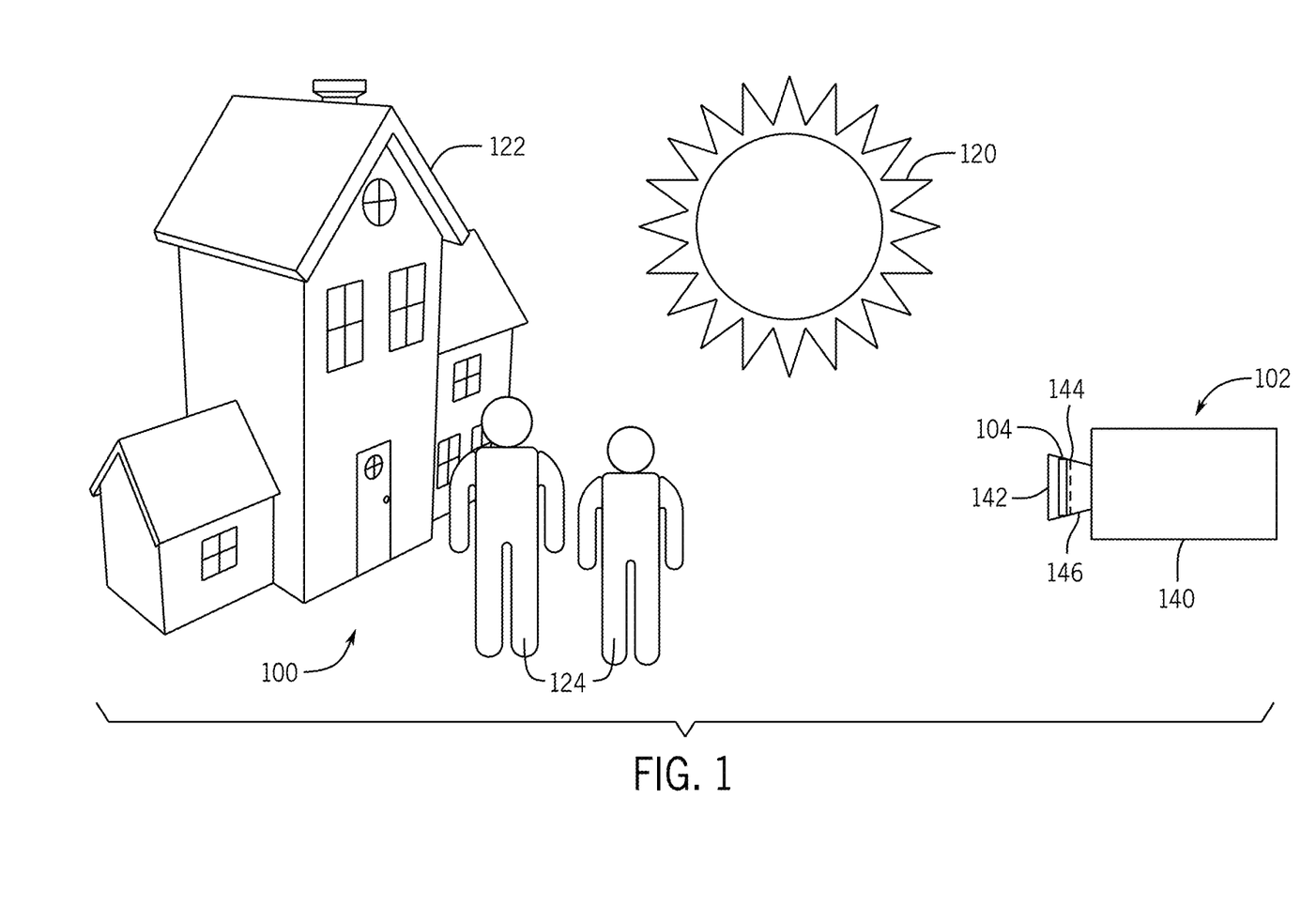
FIG. 1 is a perspective view of a scene, a camera assembly configured to capture images of the scene, and a light valve of the camera assembly that is configured to reduce an amount of light captured by the camera assembly, in accordance with one or more current embodiments.

Turning now to the drawings, FIG. 1 is a perspective view of a scene 100, a camera assembly 102 configured to capture images of the scene 100, and a light valve 104 configured to reduce an amount of light captured by the camera assembly 102. As illustrated, the scene 100 includes sunlight 120 and objects (e.g., a building 122 and people 124) that may reflect the sunlight 120. In other embodiments, the scene 100 may include other objects, scenery, structures, animals, settings, or other features in place of or in addition to the objects of the illustrated embodiment.

The camera assembly 102 includes a camera 140 configured to capture images of the scene 100, such as via still photography that captures single images, or via video photography that captures a collection of images (e.g., a video, a motion picture). For example, the camera 140 may be any suitable device configured to capture an image of light reflected by or included in the scene 100. The camera assembly 102 also includes a lens 142 and a sensor assembly 144 configured to detect light that passes through the lens 142 and the light valve 104. In some embodiments, the camera 140, or the camera assembly 102 generally, may include the light valve 104.

As illustrated, the light valve 104 is disposed between the lens 142 and the sensor assembly 144 and adjacent to the sensor assembly 144. The light valve 104 may be integrally formed with and/or rigidly coupled to the sensor assembly 144. In certain embodiments, the light valve 104 may include a support mechanism that positions the light valve 104 (e.g., light-blocking circuitry of the light valve 104) adjacent to the sensor assembly 144 and that couples the light valve 104 to a housing 146 of the camera 140 and/or to the sensor assembly 144. In some embodiments, the light valve 104 may be disposed on an opposite side of the lens 142. In such embodiments, the light valve 104 may be secured to the camera 140 (e.g., to the lens 142 and/or to the housing 146 of the camera 140) as a separate attachment via the support mechanism.

The light valve 104 is configured to reduce (e.g., at least partially block/prevent or fully block/prevent) light from entering the camera 140. For example, the light valve 104 positioned in front of the sensor assembly 144 may reduce an amount of light passing through the sensor assembly 144 to reduce potential clipping of images captured by the sensor assembly 144 and the camera assembly 102 generally. As used herein, "clipping" generally refers to portion(s) (e.g., clipped portions) of an image having a higher light level (e.g., brighter light level) relative to other portions of the image, such that the clipped portions are white, yellow, and/or other colors of light that are not the actual color of the scene 100 being captured. For example, the clipped portions of the image may not show the actual and/or true color of corresponding portions of the scene 100. As described in greater detail below, the light valve 104 may be controlled to reduce the light entering the camera assembly 102 at the portions of the image where potential clipping is identified. More specifically, the light valve 104 may be controlled on a frame-by-frame basis to reduce clipping between captured images (e.g., captured frames) and to improve an accurate capture of the scene 100 by the camera assembly 102. Additionally, as used herein, "light level" may generally refer to an amount of light captured by the camera assembly 102 (e.g., sensed by the sensor assembly 144). The light level may be measured in Nits, such that example light levels may be 1-10,000 Nits, 1-2,000 Nits, 1-1,000 Nits, 10-2000 Nits, 100-2000 Nits, 1-100 Nits, 10-1,000 Nits, 100 Nits, 200 Nits, 500 Nits, 1,000 Nits, 2,000 Nits, 10,000 Nits, and other suitable light levels.

In the illustrated embodiment, the camera assembly 102 may capture a first image of the scene 100, in which portions of the first image are clipped. For example, the first image may include the sunlight 120 reflected by the building 122 as bright, white/yellow portions of the first image. The intended subject of the scene 100 may be the people 124, but the bright portions of the first image may distract from or otherwise diminish the first image with respect to the people 124 portrayed in the first image.

Accordingly, clipping mitigation circuitry including the light valve 104 may reduce an amount of light captured by the camera assembly 102 in a second, subsequent image based on an analysis of the first image. For example, a controller of the clipping mitigation circuitry may identify locations of potential clipping within the first image, such as based on light levels of the first image. The controller may adjust the light valve 104 based on the potential clipping to reduce the amount of light captured by the camera assembly 102, thereby enhancing the next captured image and focusing the next image on the people 124.

Figure 2A:
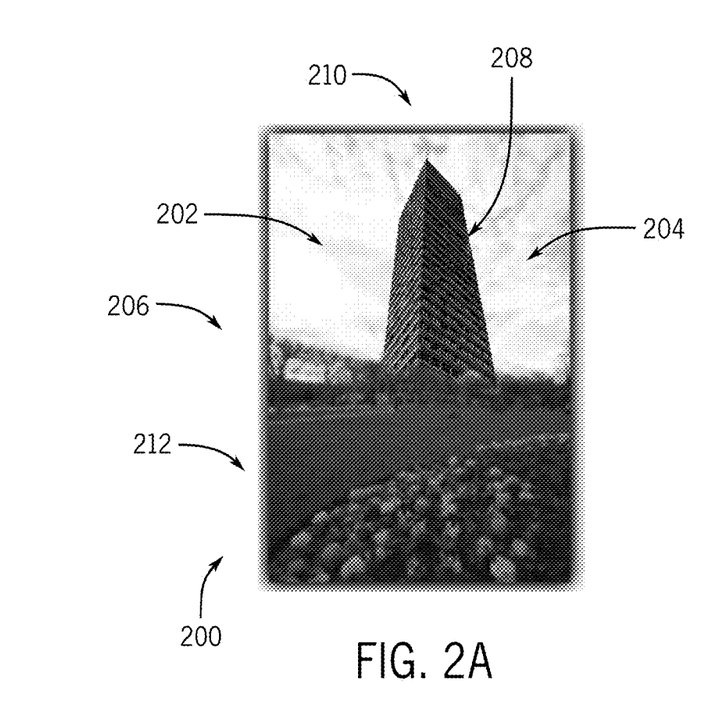
FIG. 2A is a first image that may be captured by the camera assembly of FIG. 1 including locations of potential clipping, in accordance with one or more current embodiments.

FIG. 2A is a first image 200 that may be captured by the camera assembly 102 of FIG. 1 including locations 202 and 204 of potential clipping. The first image 200 is of a scene 206 including a building 208, a sky 210, and vegetation 212. As illustrated, the locations 202 and 204 of potential clipping are generally at the sky 210 near the building 208. The building 208 may be a focus area of the camera assembly 102, such that light, colors, and shading of other portions of the image 200 (e.g., the sky 210 and the vegetation 212) are not as accurate as that of the building 208.

The camera assembly 102 may initially capture the first image 200 without the light valve 104 blocking light from entering the camera. For example, light may pass unfiltered through the lens 142 and through the sensor assembly 144 of the camera assembly 102 to capture the first image 200. Alternatively, the light valve 104 may block some light from entering the camera assembly 102 when the camera assembly 102 captures the first image 200.

As described in greater detail below, clipping mitigation circuitry (e.g., circuitry including the light valve 104 and a controller configured to control the light valve 104) may identify portions of the first image 200 that include potential clipping. The clipping mitigation circuitry may adjust the light valve 104 based on the potential clipping to reduce an amount of light captured by the camera assembly 102. For example, the clipping mitigation circuitry may identify the locations 202 and 204 as portions of the first image 200 that potentially include clipping based on a maximum light level of the first image 200 being at the locations 202 and 204, the maximum light level or another light level exceeding a threshold value, a collection of adjacent pixels at or near the maximum light level being at the locations 202 and 204, the collection of adjacent pixels exceeding a threshold pixel value, a color of the first image 200 at the locations 202 and 204, and/or based on other factors.

In certain embodiments, the clipping mitigation circuitry may identify objects and/or specific areas within the first image 200 and potential clipping at the objects and specific areas based on a transition between light values, a user input, and/or a previous adjustment to the light valve 104 based on potential clipping. In the illustrated embodiment, the clipping mitigation circuitry may identify and distinguish the sky 210 from the building 208 and the vegetation 212 based on a transition between higher/brighter light levels of the sky 210 and lower/darker light levels of the building 208 and the vegetation 212.

Figure 2B:
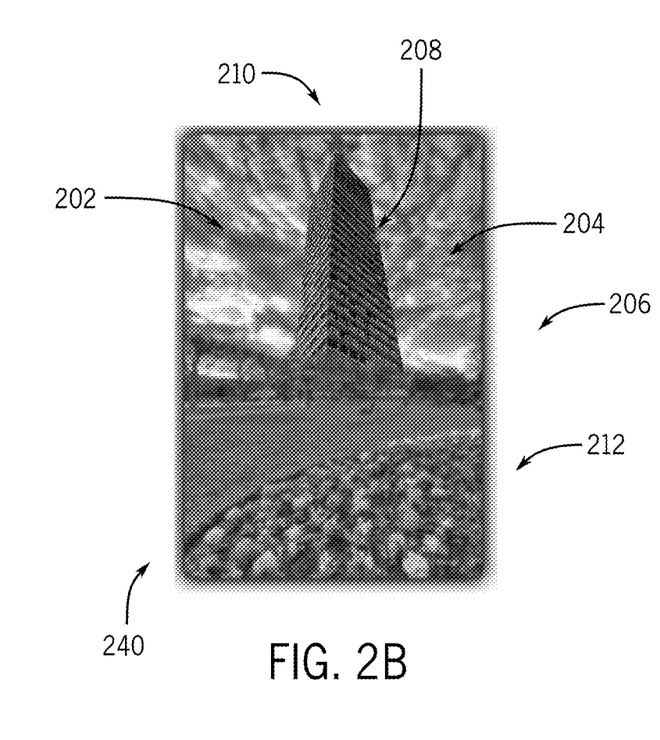
FIG. 2B is a second image that may be captured by the camera assembly of FIG. 1 after the light valve reduces the amount of light captured by the camera assembly at the locations of potential clipping, in accordance with one or more current embodiments.

After identifying that potential clipping at the sky 210 (e.g., at the locations 202 and 204), the clipping mitigation circuitry may adjust the light valve 104 to reduce an amount of light entering the camera assembly 102 at the sky 210 in a second, subsequent image (as described in reference to FIG. 2B). For example, the controller of the clipping mitigation circuitry may instruct the light valve 104 of the clipping mitigation circuitry to reduce the amount of light entering the camera assembly 102 at portions of the sensor assembly 144 that captured portions the sky 210 of the first image 200. In certain embodiments, the controller may identify specific portions/sections of the light valve 104 that correspond to the locations 202 and 204 and instruct those specific portions/sections to reduce the amount of light entering the camera assembly 102.

In some embodiments, the clipping mitigation circuitry may identify the locations 202 and 204 of potential clipping based on a Just Noticeable Difference (JND) of clipping within the first image 200. As used herein, JND generally refers to an amount of clipping in an image that is noticeable by a user viewing the image. The clipping mitigation circuitry may identify the potential clipping as locations within an image that a user may notice as being clipped. The JND may be determined based on an intended viewing device, an intended viewing method, whether the image is part of a video (e.g., a sequence of images) or is a still image, and other factors. The intended viewing device may be any viewing device intended to display the image for viewing by a user, such as a projection screen (e.g., a consumer movie theater, a home movie theater), a television, a mobile device (e.g., a tablet, a mobile phone, a wearable device), or a printed version of the image (e.g., such as a printed image in a gallery). The intended viewing method may be a linear broadcast (e.g., a planned, scheduled broadcast). In certain embodiments, the intended viewing device, the intended viewing method, and/or whether the image is a still image or part of a video (e.g., a sequence of images) may be determined based on user input(s) and/or based on information related to the image stored in a memory.

FIG. 2B is a second image 240 that may be captured by the camera assembly 102 of FIG. 1 after the light valve 104 reduces the amount of light captured by the camera assembly 102 at the locations 202 and 204. As illustrated, clipping is reduced at the locations 202 and 204 of the second image 240. Accordingly, a viewer may see white and gray clouds, sunlight, and blue portions of the sky 210 of the second image 240, rather than the white/clipped portions of the sky 210 of the first image 200. Additionally, the second image 240 includes enhanced contrast between the building 208, the sky 210, and the vegetation 212 as a result of the adjustment to the light valve 104. For example, reducing the amount of light entering the camera assembly 102 and passing through the sensor assembly 144 at the locations 202 and 204 may enable the sensor assembly 144 to better sense and capture the light levels at portions of the second image 240 including the building 208 and the vegetation 212 (e.g., in addition to the sky 210).

In certain embodiments, the first image 200 may be a first frame captured by the camera assembly 102, and the second image 240 may be a second frame captured by the camera assembly 102 immediately subsequent to the first image 200, such that the clipping mitigation circuitry may control the light valve 104 between captured frames to reduce clipping on a frame-by-frame basis. Accordingly, a viewer viewing a sequence of images captured by the camera assembly 102 may not notice the clipping in the first image 200 due to the clipping occurring in only one frame, which may enhance the viewer's experience when viewing the sequence of images. Additionally or alternatively, the first image 200 may not be included in a production of the sequence of images. The almost instantaneous adjustment to the light valve 104 by the clipping mitigation circuitry may reduce a time needed to film and capture images of the scene 206 and may reduce an amount of processing of the second image 240 and subsequent images, such as processing to correct potential clipping in the images.

The illustrated scene 206 of FIGS. 2A and 2B is an outdoor scene that generally includes locations 202 and 204 of potential clipping caused by sunlight. The clipping mitigation circuitry described herein may also address potential clipping that occurs in an indoor scene. For example, an indoor scene may include a production set with bright lights that illuminate portions of the indoor scene, such as furniture, buildings, actors/actresses, and other objects. The objects may reflect the light in a manner that causes potential clipping in captured images of the indoor scene. The clipping mitigation circuitry may identify the locations of potential clipping and adjust the light valve 104 based on the potential clipping in such indoor scenes.

Figure 3:
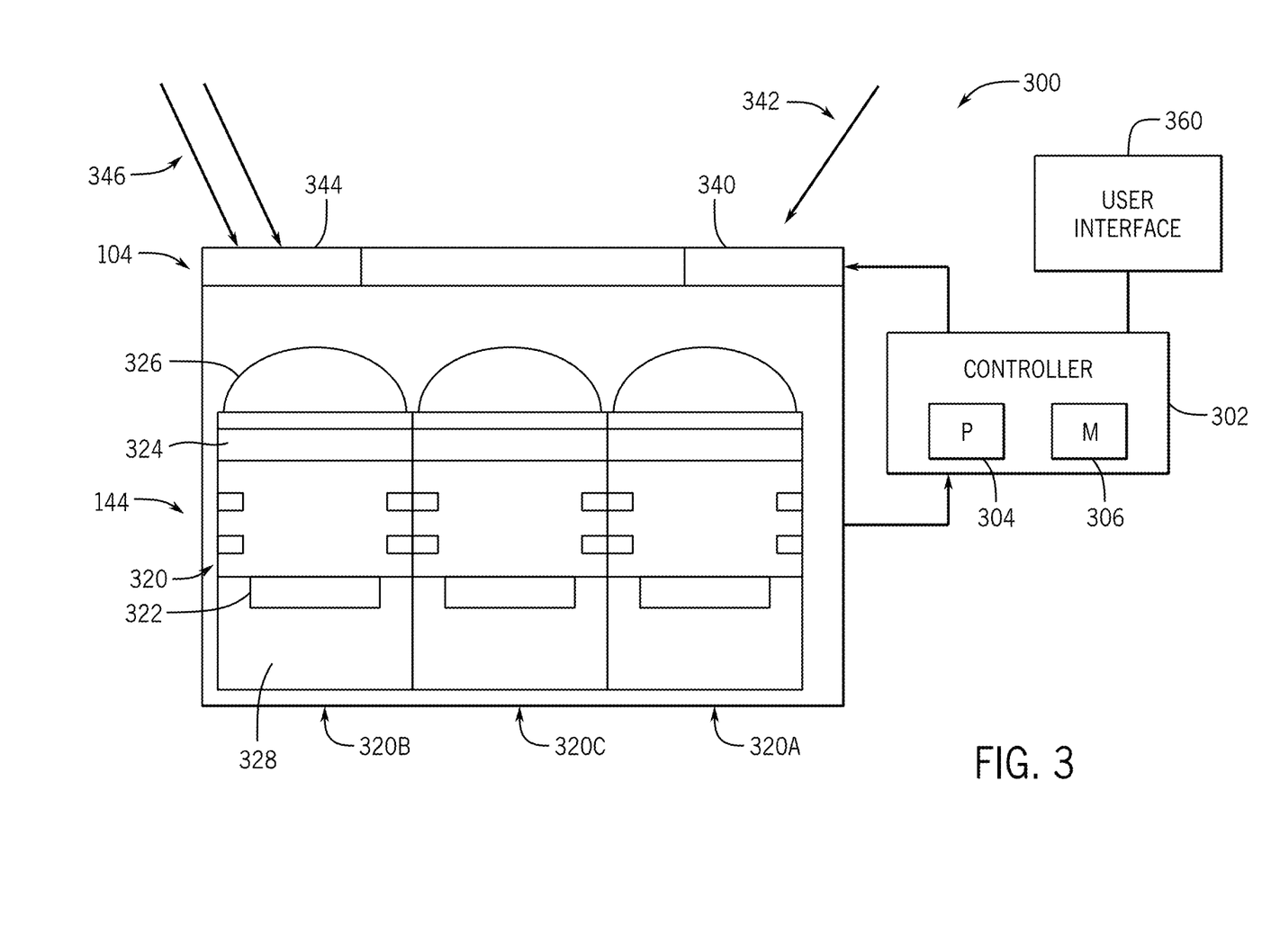
FIG. 3 is a schematic view of clipping mitigation circuitry including the light valve of FIG. 1, in accordance with one or more current embodiments.

FIG. 3 is a schematic view of clipping mitigation circuitry 300 including the light valve 104 of FIG. 1 and a controller 302 configured to control the light valve 104. The controller 302 includes a processor 304 and a memory 306. As described in greater detail below, the controller 302 is configured to receive sensor feedback indicative of light levels of a captured image from the sensor assembly 144 and control the light valve 104 based on the light levels.

As illustrated, the light valve 104 is disposed generally adjacent and parallel to the sensor assembly 144. The sensor assembly 144 includes sensors 320 configured to sense light levels (e.g., brightness), light wavelengths (e.g., colors), and other properties of light. More specifically, each sensor 320 includes a photodiode 322, a color filter 324, and a microlens 326. Each sensor 320 is configured to receive photons through the microlens 326 and the color filter 324 and to absorb the photons at the photodiode 322. The photodiode 322 may output an electrical current (e.g., a sensor signal) indicative of an amount of photons at each pixel 328 of the sensor assembly 144. Accordingly, an image, such as the first image 200, the second image 240, and other images may be formed based on sensor signals received from the sensors 320 (e.g., by a controller of the camera assembly 102, a controller communicatively coupled to the camera assembly 102, and/or by the controller 302). In certain embodiments, the light valve 104 may be rigidly coupled to the sensor assembly 144, such that light that passes through certain portions/sections of the light valve 104 is consistently directed toward and/or flows to specific sensor(s) 320 of the sensor assembly 144.

Light (e.g., photons) may be directed toward the light valve 104. In an example embodiment, light of a higher (e.g., brighter) light level may be directed to a right portion 340 of the light valve 104, as indicated by arrow 342, and light of a lower (e.g., darker) light level may be directed to a left portion 344 of the light valve 104, as indicated by arrows 346. The photons may pass through the light valve 104 and be absorbed/detected by the sensor assembly 144. Each sensor 320 may output a sensor signal indicative of a respective light level to the controller 302. For example, a sensor 320A on the right side of the sensor assembly 144 may output a sensor signal indicative of a high light level (e.g., a maximum light level), a sensor 320B on the left side of the sensor assembly 144 may output a sensor signal indicative of a low light level, and a sensor 320C in the middle portion of the sensor assembly 144 may output a sensor signal indicative of a medium light level (e.g., a light level between the high and low light levels).

In response to receiving the sensor feedback indicative of light levels from the sensors 320, the controller 302, via the processor 304, may determine locations of potential clipping within an image, such as an image generated based on the sensor feedback. For example, in the illustrated embodiment, a right portion of a generated image may include locations of potential clipping (e.g., similar to the locations 202 and 204 of FIG. 2A), while a left portion of the generated image does not include locations of potential clipping. The controller 302, via the processor 304, may adjust the light valve 104 based on the potential clipping. For example, instructions (e.g., control signal(s)) provided by the controller 302, via the processor 304, to the light valve 104 may adjust the right portion 340 of the light valve 104 to block a portion of light passing through the light valve 104 to the sensor assembly 144, while not blocking or blocking less light passing through the left portion 344 of the light valve 104. In response, the light valve 104 may reduce the amount of light (e.g., photons) passing to the sensor assembly 144 accordingly. In some embodiments, the instructions provided by the controller 302 may indicate a percentage of light to block or a percentage of light to pass through to the sensor assembly 144 at each portion/section of the light valve 104. Such percentages may be 0.1 percent, 0.5 percent, 1 percent, 2 percent, 5 percent, 10 percent, 20 percent, 50 percent, 80 percent, 90 percent, 95 percent, 98 percent, 99 percent, 99.5 percent, 99.9 percent, or other suitable percentages or ranges of percentages.

In certain embodiments, the controller 302 may determine portions of the image that include clipping based on a comparison of a light level to a threshold value. For example, based on a light level exceeding the threshold value, the controller 302 may instruct a portion of the light valve 104 corresponding to the light level to reduce the amount of light passing through the light valve 104, such that the light level is reduced below the threshold and/or to another specific level. The controller 302 may determine the threshold value based on a type of scene being captured (e.g., an outdoor scene, an indoor scene, a scene with moving and/or still objects), a time of day/night, user input(s), and other factors that may affect light levels in the image.

In some embodiments, the controller 302 may determine potential clipping based on multiple pixels in a portion of the image exceeding the threshold value. For example, based on the light level of each pixel of the multiple pixels exceeding the threshold value, the controller 302 may adjust the light valve 104 to reduce the amount of light entering the camera assembly 102 at the multiple pixels. In certain embodiments, the controller 302 may determine an average value or a median value of the light levels for the multiple pixels and adjust the light valve 104 based on the average value or median value exceeding the threshold value.

The controller 302 may determine potential clipping and an associated adjustment to the light valve 104 based on color(s) of image locations including potential clipping. Certain colors may be more or less susceptible to clipping and/or certain colors may require more or less adjustments to compensate for potential clipping. For example, image locations that are primarily blue may not require as much of an adjustment relative to image locations that are primarily red, green, magenta, and/or other mixtures of red and green. The sensor feedback received by the controller 302 from the sensor assembly 144 may include the color(s) at each image location. The controller 302 may determine potential clipping based on the colors at each image location and adjust the light valve 104 based on the potential clipping, as described herein.

In certain embodiments, the controller 302 may determine a smoothing operation including a percentage and/or a fraction of the adjustment to the light valve 104 to implement over multiple images, such that the adjustment to the light valve 104 is implemented gradually to improve an experience of a user viewing the captured images (e.g., viewing a video including the captured images) by keeping the adjustment below a JND of light values between consecutive images/frames. For example, the controller 302 may first determine the percentage adjustment of light to block or pass through to the sensor assembly 144. Next, the controller 302 may determine a percentage or fraction of the percentage adjustment to implement in subsequent image(s). For example, if the percentage adjustment is implemented over the next two images, half of the percentage adjustment may be implemented in a second image, and half of the percentage adjustment may be implemented in a third image. In other embodiments, the percentage adjustment may be implemented over more subsequent images (e.g., 3 images, 4 images, 10 images, 32 images). The controller 302 may determine whether to implement the percentage adjustment gradually (e.g., over multiple images) and an amount of such images to include in the adjustment based on an amount of the percentage adjustment, sizes of the locations of the image that include the potential clipping, a determined JND, and/or a user input. For example, higher percentage adjustments may include the gradual adjustment more often and/or may include more images in the gradual adjustment relative to lower percentage adjustments.

In some embodiments, smaller portions of the image that include potential clipping may include the gradual adjustment more often and/or may include more images in the gradual adjustment relative to larger portions of the image that include potential clipping. For example, the adjustment to the light valve 104 may implemented in a single image (e.g., for the next frame in a sequence of frames or captured frames) to mitigate potential artifacts (e.g., dark areas around objects and the locations of potential clipping). More specifically, a relatively large object may benefit more from the adjustment to the light valve 104 in the next image/frame due to the artifact for the relatively large object potentially being more noticeable to a viewer (e.g., relative to a potential artifact for a smaller object).

In some embodiments, adjustments for still images may be more aggressive than adjustments for video images. For example, a photographer using the camera assembly 102 to take photographs (e.g., still images) of a scene may take an initial photograph that includes locations of clipping. The clipping mitigation circuitry of the camera assembly 102 may identify such clipping and adjust the light valve 104 to reduce and/or prevent clipping in the next photograph taken by the photographer. Alternatively, a videographer may use the camera assembly 102 to film a video (e.g., multiple, sequenced images) of the scene. A first image of the video may include clipping. The clipping mitigation circuitry may implement the adjustment to the light valve 104 over multiple, subsequent images to reduce the potential for perceived artifacts by a viewer of the video.

In certain embodiments, the light valve 104 may include a liquid crystal display (LCD) screen configured to reduce an amount of light passing through to the sensor assembly 144. In some embodiments, the light valve 104 may include other features configured to reduce the amount of light passing through to the sensor assembly 144, such as other polarization filters.

The clipping mitigation circuitry 300 may include a user interface 360 (e.g., a graphical user interface (GUI)) configured to receive user inputs, such as an input identifying an adjustable portion of the light valve 104, locations of potential clipping in an image, a size of each location of the locations of potential clipping, and/or an adjustment color for each location of potential clipping. For example, the user interface 360 may be configured for entry and/or selection of each of the user inputs described herein, such as via a manual data entry field, a drop-down menu, and other suitable entry and/or selection fields. The user interface 360 is communicatively coupled to the controller 302, such that the controller 302 may receive signals indicative of the user inputs and make determinations based on the inputs, such as the locations of an image that include potential clipping, adjustments to the light valve based on potential clipping, and other determinations.

In certain embodiments, the user interface 360 may include a display configured to display an image generated based on the light levels sensed by the sensor assembly 144. For example, the controller 302 may generate the image and provide the image to the user interface 360 for display to a user. The user may view the image and provide user inputs based on the image. In some embodiments, the display may be a touch screen display configured to detect a user's touch/interaction, and the user may identify the locations of potential clipping by touching the display at such locations.

In some embodiments, the user input may designate a portion of an image that should be analyzed for potential clipping and/or a time period in which images of a video should be analyzed for potential clipping. For example, the user input may designate that a top portion, a bottom portion, a side portion, and/or portions of certain shapes within the image are more likely to include clipping relative to other portions of the image. The controller 302 may analyze only those designated portions of the image for potential clipping and/or only those images in the designated time period for potential clipping, which may reduce processing of the images, thereby reducing power consumed by the controller to analyze the image and an amount of time required to analyze the image.

By way of specific example, in a video filmed in an indoor sports stadium, the camera assembly 102 may capture a first image including a playing surface and players on the playing surface. The camera assembly 102 may then pan toward the crowd near the playing surface, and such a shot may include lighting within the stadium. The lighting may result in clipping in the second image, such that crowd is not as visible as intended by a user of the camera assembly 102. Accordingly, a user input may identify a time period during which the pan of the camera assembly 102 to the crowd is anticipated, such that images captured during the time period are processed for potential clipping differently relative to images captured outside the time period. For example, the images captured during the time period may have a higher or lower threshold level of clipping, thereby facilitating accurate portrayal of the crowd in image captured during the time period.

In certain embodiments, the controller 302 may perform a location calibration step/process for the light valve 104 based on a position of the light valve 104 relative to the sensor assembly 144. For example, the controller 302 may determine which portions of the light valve 104 align with and/or correspond to specific sensors 320 of the sensor assembly 144. A known, constant light source may be provided, and each adjustable portion/section of the light valve 104 may be adjusted to a different percentage (e.g., each section may block or allow a different percentage of light to pass through relative to other sections). The light source may provide constant, even light through each portion/section of the light valve 104. Based on the light level sensed at each sensor 320, the controller 302 may determine which portion/section of the light valve 104 aligned with each sensor 320. The calibration may be performed during/after initial assembly or installation of the light valve 104 and/or during/after maintenance of the light valve 104 or the camera assembly 102 generally. Based on the location calibration, the controller 302 may determine which portions of the light valve 104 to adjust based on potential clipping identified for corresponding sensors 320 of the sensor assembly 144.

As described herein, the light valve 104 may include portions and/or sections. Such portions/section may be individually controllable to block a percentage of light from passing through the light valve and/or to allow a percentage of light to pass through the light valve 104. The portions/sections may be square sections that are generally the same size as the sensors 320. For example, each portion/section may correspond to one sensor 320. In some embodiments, the portions/sections may be larger or smaller than the sensors 320. For example, square portions/sections may each correspond to four sensors 320 in a square arrangement. The controller 302 may determine an average of the light levels for the four sensors 320 to determine potential clipping at the four sensors and a corresponding adjustment to the square portion/section of the light valve 104. The other embodiments, the portions/sections of the light valve 104 may each correspond to a different number of sensors 320 (e.g., two sensors 320, three sensors 320, five sensors 320, eight sensors 320, sixteen sensors 320, sixty-four sensors 320).

The controller 302 may include one or more processors (illustrated and referred to in this disclosure as a single processor 304) and one or more memory or storage devices (illustrated and referred to in this disclosure as a single memory device 306). The processor 304 may execute software programs and/or instructions stored in the memory device 306 that facilitate determining locations of potential clipping in an image, calibration of the light valve 104, and adjusting the light valve 104. Moreover, the processor 304 may include multiple microprocessors, one or more "general-purpose" microprocessors, one or more special-purpose microprocessors, and/or one or more application specific integrated circuits (ASICs). For example, the processor 304 may include one or more reduced instruction set computer (RISC) processors. The memory device 306 may store information such as control software, look up tables, configuration data, and so forth. The memory device 306 may include a tangible, non-transitory, machine-readable-medium, such as volatile memory (e.g., a random access memory (RAM)), nonvolatile memory (e.g., a read-only memory (ROM)), flash memory, one or more hard drives, and/or any other suitable optical, magnetic, or solid-state storage medium.

Figure 4:
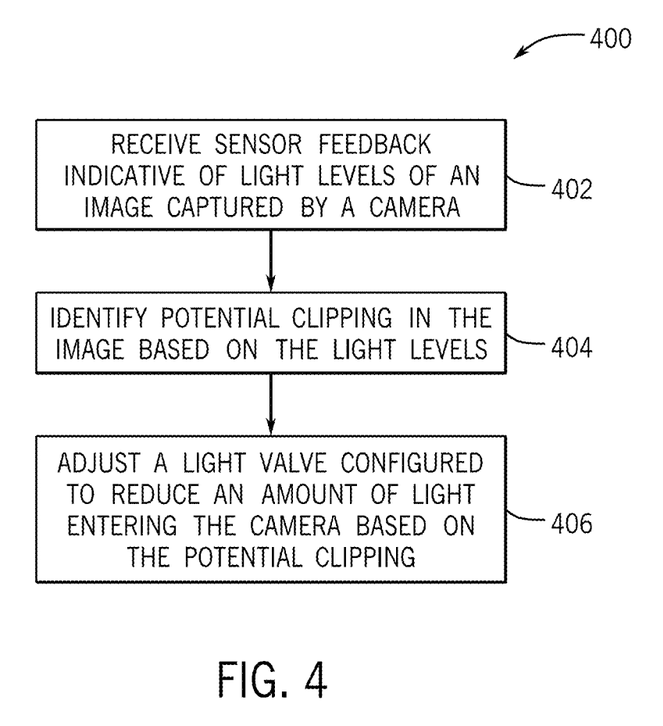
FIG. 4 is a flow diagram depicting a method for controlling the light valve of FIG. 1, in accordance with one or more current embodiments.

FIG. 4 is a flow diagram depicting a method 400 for controlling the light valve 104 of FIG. 1. Each block of the method 400 (e.g., blocks 402, 404, and 406) may be performed by the clipping mitigation circuitry 300 and/or by the controller 302 of the clipping mitigation circuitry 300. While the method 400 is described using steps in a specific sequence, it should be understood that the present disclosure contemplates that the described steps may be performed in different sequences than the sequence illustrated, and certain described steps may be skipped or not performed altogether. In some embodiments, the method 400 may be implemented by executing instructions stored in a tangible, non-transitory, computer-readable medium, such as the memory device 306, using a processor, such as the processor 304.

As generally described above, the clipping mitigation circuitry 300 may receive sensor feedback indicative of light level(s) from the sensor assembly 144, as indicated by block 402. For example, each sensor 320 of the sensor assembly 144 may output a sensor signal indicative of a light level, which may be received by the controller 302. Some or all light levels provided by the sensor assembly 144 may be the same or may be different. In certain embodiments, the light levels may include an intensity and/or a color of light. The multiple light levels may form an image. For example, the clipping mitigation circuitry 300 may generate the image based on the light levels.

At block 404, the clipping mitigation circuitry 300 may identify potential clipping in the image based on the light levels. For example, as described above, the clipping mitigation circuitry 300 may identify locations of potential clipping within the image based on a maximum light level of the image, the maximum light level or another light level exceeding a threshold value, a collection of adjacent pixels at or near the maximum light level, the collection of adjacent pixels exceeding a threshold pixel value, color(s) of the image at certain locations, and/or based on other factors. In certain embodiments, the clipping mitigation circuitry 300 may identify locations of potential clipping within the image based on user input(s), such as an input identifying an adjustable portion of the light valve 104, locations of potential clipping in the image, a size of each location of potential clipping, and/or an adjustment color for each location of potential clipping. In some embodiments, the clipping mitigation circuitry 300 may identify objects and/or specific areas within the image and potential clipping at the objects based on a transition between light values, a user input, and/or a previous adjustment based on potential clipping.

At block 406, the clipping mitigation circuitry 300 may adjust the light valve 104 (e.g., light-blocking circuitry) to reduce an amount of light entering the camera assembly 102 based on the potential clipping. The adjustment to the light valve 104 may identify specific portions/sections of the light valve 104 to be adjusted, a percentage of light that each respective portion/section should block or allow to pass through to the sensor assembly 144, and/or a number of captured images over which to implement the adjustment. For example, as described above, the clipping mitigation circuitry 300 may gradually implement the adjustment to the light valve 104 over multiple images to improve an experience of a user viewing the captured images (e.g., viewing a video including the captured images). Additionally, as described above, the adjustment to the light valve 104 may be implemented in a single image (e.g., for the next frame in a sequence of frames or captured frames) to mitigate potential artifacts (e.g., dark areas around objects and the locations of potential clipping). Such adjustments by the clipping mitigation circuitry 300 to images captured by the camera assembly 102 may enhance visibility of portions of the images, such as the sky 210 in FIG. 2B, thereby enhancing an experience of a user viewing the images.

In certain embodiments, the clipping mitigation circuitry 300 described herein may record a neutral density filter value to enable restoration of the true brightness of the captured image without clipping or with reduced clipping (e.g., as a part of or in addition to the method 400). For example, the neutral density filter value may generally refer to the amount of light filtered/blocked by the light valve 104. If portion(s) of or the entire captured image is too dark (e.g., the image captured after the adjustment to the light valve 104), the neutral density filter value may be used to adjust captured image to the true brightness. Such adjustment may occur in real-time, such as within the camera assembly 102, or may occur as a post-production step (e.g., after filming a scene in a television or motion picture setting).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A clipping mitigation circuitry comprising:
a light valve configured to be directly coupled to a sensor assembly configured to provide sensor feedback indicative a plurality of light levels of an image captured by a camera; and
a controller comprising a processor and a memory, wherein the processor is configured to:
receive the sensor feedback from the sensor assembly;
determine a maximum light level of the plurality of light levels;
identify one or more locations of potential clipping within the image based on the one or more locations having the maximum light level of the plurality of light levels;
determine that the maximum light level exceeds a threshold value; and
in response to determining that the maximum light level exceeds the threshold value, adjust the light valve to reduce an amount of light captured by the camera at the one or more locations.

2. The clipping mitigation circuitry of claim 1, wherein the light valve is configured for attachment to the camera, configured to be rigidly coupled to the sensor assembly, or both.

3. The clipping mitigation circuitry of claim 1, wherein the light valve comprises a liquid crystal display (LCD) screen configured to reduce the amount of light captured by the camera.

4. The clipping mitigation circuitry of claim 1, wherein the image comprises a first image, and wherein the processor is configured to:
determine an adjustment to the light valve that reduces the potential clipping;
determine a smoothing operation comprising a percentage of the adjustment to implement for a second image based on a size of each location of the potential clipping within the first image, wherein the camera is configured to capture the second image subsequent to the first image; and
adjust the light valve based on the smoothing operation to reduce the potential clipping in the second image by the percentage of the adjustment.

5. The clipping mitigation circuitry of claim 1, wherein the processor is configured to iteratively adjust the light valve based on a plurality of light levels for each image of a plurality images captured by the camera subsequent to the image on a frame-by-frame basis.

6. The clipping mitigation circuitry of claim 1, wherein the processor is configured to:
receive a user input indicative of an adjustable portion of the light valve based on the potential clipping, the one or more locations of the potential clipping, a size of each location of the one or more locations, an adjustment color for each location of the one or more locations, or any combination thereof; and
adjust the light valve to reduce the amount of light captured by the camera based on the user input.

7. The clipping mitigation circuitry of claim 1, comprising the sensor assembly, wherein the sensor assembly comprises one or more sensors configured to provide the sensor feedback, and wherein the one or more sensors comprises a plurality of photodiodes, and each photodiode is configured to sense the amount of light.

8. The clipping mitigation circuitry of claim 7, wherein the one or more sensors comprise a plurality of microlenses and a plurality of color filters disposed between the light valve and the plurality of photodiodes, and wherein the plurality of photodiodes are configured to sense the amount of light passed through the plurality of microlenses and the plurality of color filters.

9. A method for controlling a light valve configured to reduce an amount of light captured by a camera, the method comprising:
receiving an indication of a plurality of light levels of an image captured by the camera;
receiving a user input indicative of an intended viewing device, an intended viewing method, whether the image is part of a video or is a still image, or any combination thereof;
determining a Just Noticeable Difference (JND) as an amount of clipping in the image that is noticeable while viewing the image, and wherein the JND is determined based on the user input;
identifying one or more locations of potential clipping within the image based on the plurality of light levels and the JND; and
adjusting the light valve to reduce the amount of light captured by the camera at the one or more locations to compensate for the JND.

10. The method of claim 9, comprising identifying the one or more locations of the potential clipping within the image based on a maximum light level of the plurality of light levels, the maximum light level or another light level exceeding a threshold value, a collection of adjacent pixels having the maximum light level, the collection of adjacent pixels exceeding a threshold pixel value, a contrast between first light levels of the collection of adjacent pixels and second light levels of other pixels, or any combination thereof.

11. The method of claim 9, wherein the image comprises a first image, and wherein the method comprises:
determining an adjustment to the light valve that reduces the potential clipping;
determining a smoothing operation comprising a percentage of the adjustment to implement for a second image based on a size of each location of the potential clipping within the first image, wherein the camera is configured to capture the second image subsequent to the first image; and
adjusting the light valve based on the smoothing operation to reduce the potential clipping in the second image by the percentage of the adjustment.

12. The method of claim 9, comprising:
receiving an additional user input indicative of an adjustable portion of the light valve based on the potential clipping, the one or more locations of the potential clipping, a size of each location of the one or more locations, an adjustment color for each location of the one or more locations, or any combination thereof; and
adjusting the light valve to reduce the amount of light captured by the camera based on the additional user input.

13. The method of claim 9, wherein adjusting the light valve comprises:
identifying one or more portions of the light valve corresponding to the locations of potential clipping;
identifying a respective percentage adjustment for each portion of the one or more portions based on the plurality of light levels; and
reducing the amount of light passing through each portion by the respective percentage adjustment.

14. A camera assembly comprising:
a sensor assembly configured to detect light entering the camera assembly; and
light-blocking circuitry configured to block light directed toward the sensor assembly, wherein the light-blocking circuitry is configured to receive a command indicative of an adjustment to block light entering the camera assembly to prevent potential clipping in an image captured by the camera assembly based at least in part on a user input indicative of an intended viewing device, an intended viewing method, or both, and wherein the light-blocking circuitry is coupled to the sensor assembly and configured to be disposed between a lens of the camera assembly and the sensor assembly.

15. The camera assembly of claim 14, wherein the light-blocking circuitry comprises a liquid crystal display (LCD) screen configured to reduce an amount of light directed toward the sensor assembly.

16. The camera assembly of claim 14, comprising a controller comprising a processor and a memory, wherein the processor is configured to:
receive, from the sensor assembly, sensor feedback indicative of a plurality of light levels detected by the sensor assembly;
identify potential clipping based on the plurality of light levels; and
adjust the light-blocking circuitry based on the potential clipping.

17. The camera assembly of claim 16, wherein the processor is configured to:
identify one or more locations of the potential clipping based on a maximum light level of the plurality of light levels, the maximum light level or another light level exceeding a threshold value, a collection of adjacent pixels having the maximum light level, the collection of adjacent pixels exceeding a threshold pixel value, a contrast between first light levels of the collection of adjacent pixels and second light levels of other pixels, or any combination thereof; and
adjust the light-blocking circuitry to reduce an amount of light at the one or more locations.

18. The camera assembly of claim 16, wherein the processor is configured to iteratively adjust the light-blocking circuitry based on a plurality of light levels for each image of a plurality images captured by the camera assembly subsequent to the image on a frame-by-frame basis.

* * * * *